(12) United States Patent
Englbrecht et al.

(10) Patent No.: US 7,017,943 B2
(45) Date of Patent: Mar. 28, 2006

(54) GAS GENERATING DEVICE

(75) Inventors: Karl Englbrecht, Erharting (DE); Karsten Schwuchow, Wasserburg (DE)

(73) Assignee: TRW Airbag Systems GmbH, Aschau Inn (DE)

( * ) Notice: Subject to any disclaimer, the term of this patent is extended or adjusted under 35 U.S.C. 154(b) by 240 days.

(21) Appl. No.: 10/630,149

(22) Filed: Jul. 30, 2003

(65) Prior Publication Data
US 2004/0026910 A1 Feb. 12, 2004

(30) Foreign Application Priority Data
Aug. 12, 2002 (DE) ............ 202 12 384 U

(51) Int. Cl.
*B60R 21/26* (2006.01)

(52) U.S. Cl. .......................... 280/736; 222/3

(58) Field of Classification Search .......... 280/736, 280/737, 741, 742, 740; 102/530, 531; 222/3
See application file for complete search history.

(56) References Cited

U.S. PATENT DOCUMENTS

| | | | |
|---|---|---|---|
| 3,711,115 A * | 1/1973 | Lohr ........................ | 280/736 |
| 3,877,719 A | 4/1975 | Lewis et al. | |
| 3,944,249 A * | 3/1976 | Smith et al. ............... | 280/742 |
| 4,021,058 A | 5/1977 | Suzuki et al. | |
| 5,593,180 A * | 1/1997 | Cuevas et al. ............ | 280/741 |
| 5,642,902 A * | 7/1997 | France .................... | 280/737 |
| 5,899,492 A * | 5/1999 | Okada et al. ............. | 280/736 |
| 6,152,484 A | 11/2000 | Fischer et al. | |
| 6,616,177 B1 * | 9/2003 | Thomas et al. ........... | 280/729 |

FOREIGN PATENT DOCUMENTS

| | | |
|---|---|---|
| DE | 19834690 A1 | 2/2000 |
| DE | 10033319 A1 | 1/2002 |
| GB | 1324401 | 7/1973 |
| WO | WO 01/62557 A1 | 8/2001 |

* cited by examiner

*Primary Examiner*—David R. Dunn
(74) *Attorney, Agent, or Firm*—Tarolli, Sundheim, Covell & Tummino L.L.P.

(57) ABSTRACT

A gas generating device comprises a gas generator (10) which has an outer housing (12), and a gas conduit pipe (50) which is connected to the gas generator (10) and via which a gas flows out from the gas generator (10). The outer housing (12) has at least two openings (40, 42) via which the gas conduit pipe (50) is fastened to the outer housing (12) and through which the gas can flow out when the gas conduit pipe (50) is not installed. The gas generator (10) is neutral with respect to thrust without the gas conduit pipe (50) arranged on it. The gas conduit pipe (50) projects into the interior of the gas generator (10) via at least one of the openings (40, 42).

14 Claims, 2 Drawing Sheets

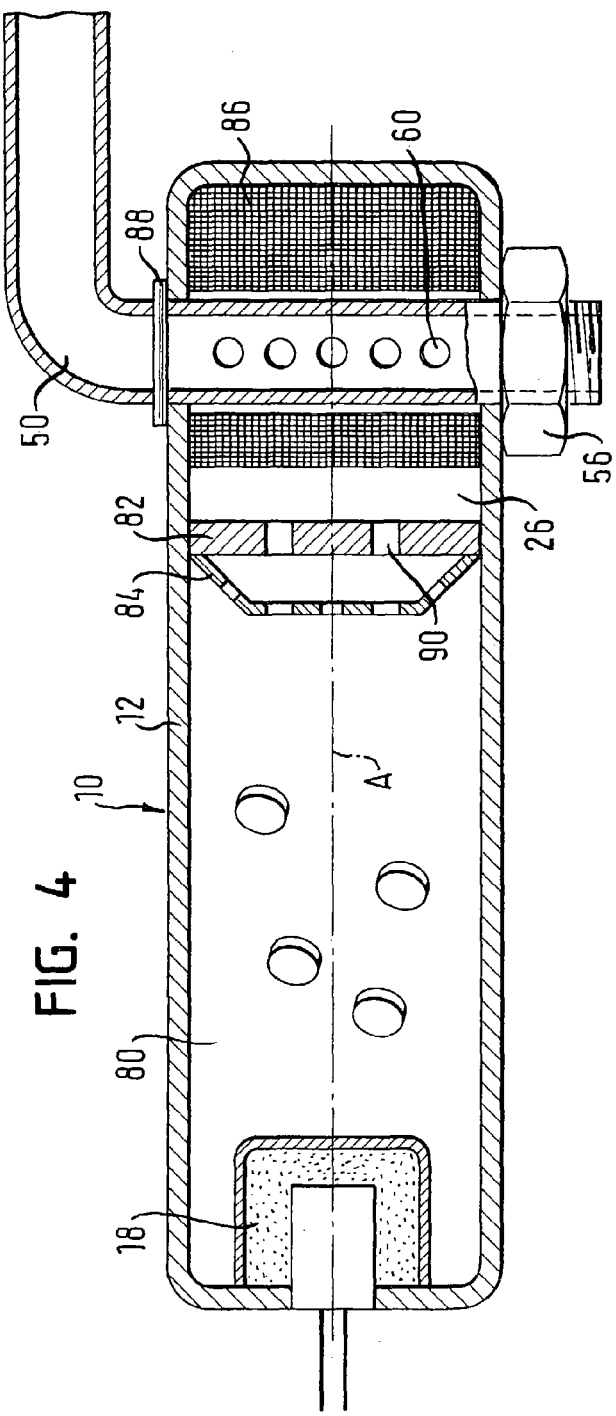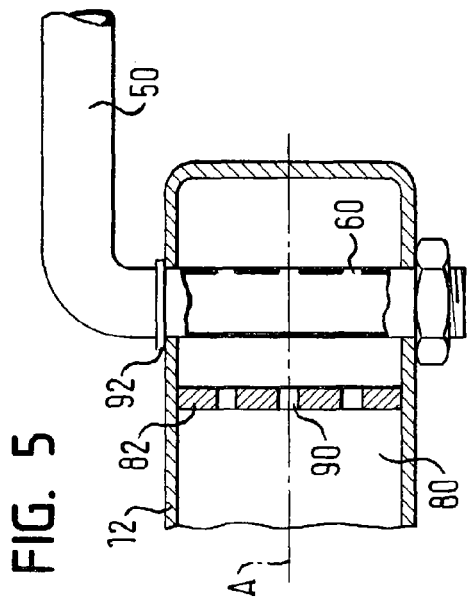

GAS GENERATING DEVICE

TECHNICAL FIELD

The invention relates to a gas generating device comprising a gas generator which has an outer housing, and a gas conduit pipe which is connected to the gas generator and via which a gas flows out from the gas generator.

BACKGROUND OF THE INVENTION

Gas generating devices for safety arrangements on a vehicle have, in part, gas conduit pipes which have the advantage that the gas generator can be arranged further away from the gas consumer (e.g. gas bag or belt tensioner). Furthermore, gas conduit pipes also make possible an outflow to the consumer which occurs across a larger area and is more uniform, e.g. in the case of a window bag having a large area, in which a gas conduit pipe with lateral outflow openings distributed over its length may extend into the interior of the window bag.

With regard to an unintentional activation of the gas generator during transportation or storage, the gas generators are to be constructed so as to be neutral with respect to thrust in the non-installed state. DE 100 33 319 A1 describes a generic gas generating device, in which according to FIG. 3 a tube having a flange is fastened from outside to one side of the outer housing. The tube carries latching hooks which engage into openings in the outer housing.

BRIEF SUMMARY OF THE INVENTION

The invention provides a simply-constructed gas generating device which makes possible a good and gas-tight fastening between the gas conduit tube and the outer housing. What is more, it is not only intended to allow a simple and safe assembly of the individual parts, but also a simple transport of these individual parts. According to the invention, this is achieved in a gas generating device comprising a gas generator which has an outer housing, and a gas conduit pipe which is connected to the gas generator and via which a gas flows out from the gas generator. The outer housing has at least two openings via which the gas conduit pipe is fastened to the outer housing and through which the gas can flow out in a non-installed state of the gas conduit pipe (when the gas conduit pipe is not mounted to the housing). The gas generator is neutral with respect to thrust in the non-installed state. The gas conduit pipe projects into the interior of the gas generator via at least one of the openings. In the gas generating device according to the invention, the openings in the outer housing have a dual function, by on the one hand serving for fastening the gas conduit pipe and on the other hand at the same time serving as outflow openings for the gas when the gas conduit pipe is not installed. This allows the gas generator and the gas conduit pipe to be stored and transported separately, and the gas conduit pipe to be fastened quickly and simply to the gas generator shortly before the final assembly. In the transport state, therefore, the gas conduit pipe is not fastened to the gas generator, which makes it simpler to construct the gas generator so as to be neutral with regard to thrust. The neutrality with regard to thrust usually no longer exists in the fastened gas conduit pipe. Via at least one of the two openings, the gas conduit pipe, contrary to the teaching of DE 100 33 319 A1, projects into the interior of the gas generator, which improves the arranging and fixing in position of the gas conduit pipe; the gas conduit pipe may also extend through both openings and through the entire outer housing.

By the gas conduit pipe projecting at least into the interior of the gas generator, preferably even projecting right through the outer housing, an extensive sealing of the openings can be achieved relatively simply, when the gas conduit pipe is installed. It is to be stressed, however, that in certain embodiments it is not necessary to achieve a complete sealing between the outer housing and the gas conduit pipe if, for example, for reasons of cost small leakage flows are tolerable.

When the gas generator has a central axis and the two openings are arranged diametrically hereto, a neutrality with regard to thrust is in any case ensured with respect only to these two openings. However, it is to be stressed that it would theoretically be possible to also provide further outflow openings in addition to the two openings associated with the gas conduit pipe, if for example the gas generator is housed in one chamber of a gas bag and the gas conduit pipe leads to another chamber.

Furthermore, the two openings may, however, also be the only outflow openings of the gas generator with the gas conduit pipe being not installed.

When the gas conduit pipe extends into the interior of the gas generator, it can be useful for the gas conduit pipe to have lateral inlet openings.

A possibility for simple fastening of the gas conduit pipe consists in that the latter has a stop at one end, projecting out from the outer housing, and at the opposite end a clamping device, e.g. a nut. The stop may, for example, be a flange formed by deforming the pipe, the outer housing being clamped between the flange and the nut.

An axial end of the gas conduit pipe may be closed, if appropriate.

An embodiment of the invention makes provision that the gas generator is constructed so as to have at least two stages and the gas conduit pipe is arranged between the at least two stages, i.e. forms the common outlet of at least two stages.

In this respect, a common outflow space can be provided between two stages, into which the gas conduit pipe opens. The "stages" are either, in a purely pyrotechnic gas generator, the combustion chambers or, in a hybrid gas generator, the chambers filled with compressed gas. When the outflow space lies between the two stages, i.e. between the combustion chambers or the chambers filled with compressed gas, the gas conduit pipe can also act as an intermediate wall between the two stages, which prevents an ignition transfer or an opening of the opposite chamber, when only one stage is to be activated.

The gas conduit pipe may also act as a kind of filter, when its inlet opening is not immediately facing the gas flow from at least one combustion chamber or a chamber filled with compressed gas, for example by being arranged 90° to the gas flow or even facing away therefrom.

BRIEF DESCRIPTION OF THE DRAWINGS

FIG. 4 shows a longitudinal sectional view through a gas generating device according to a further embodiment, and FIG. 5 shows a variant of the embodiment according to FIG. 4.

DETAILED DESCRIPTION OF THE PREFERRED EMBODIMENT

Figure 1:
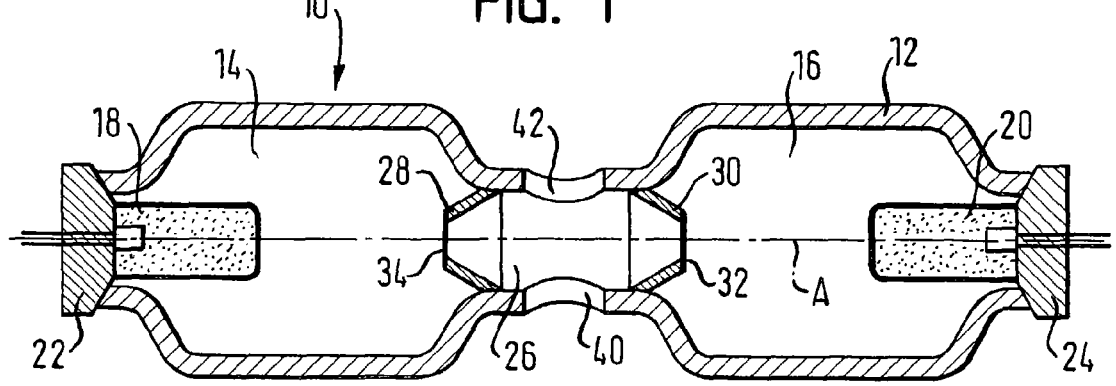
FIG. 1 shows a longitudinal sectional view through a two-stage gas generator of a gas generating device according to the invention in a non-installed state of the gas conduit device.

In FIG. 1 a gas generator 10 is illustrated, which has an outer housing 12. The gas generator 10 is a two-stage tubular gas generator, the first stage of which is formed by a chamber 14 filled with compressed gas, and the second stage of which is formed by a chamber 16, likewise filled with compressed gas. The tubular outer housing 12 has openings at its axial ends, via which the igniters 18, 20 project into the interior of the associated chamber 14 and 16, respectively. Plug-like closures 22, 24 seal off the chambers 14 and 16, respectively, to the exterior at the ends.

The chambers 14, 16 have a common outflow space 26 arranged between them, towards which they are each sealed off by means of a membrane holder 28, 30 and associated membranes 32, 34 fastened thereon.

The outer housing 12 has a groove-like depression in the region of the outflow space 26. At the base of this depression, two continuous openings 40, 42 are provided in the outer housing 12, diametrically arranged with respect to the central axis A of the outer housing 12.

The two openings 40, 42 are arranged axially half-way between the membranes 34, 36.

The gas generator 10 is constructed so as to be, in itself, neutral with respect to thrust. The only outflow openings for the gas becoming free on ignition of at least one igniter 18, 20 are formed the openings 40, 42. As these have the same diameter and are arranged diametrically with respect to each other, no thrust occurs in the case of an unintentional activation of the gas generator during transportation or storage.

Figure 3:
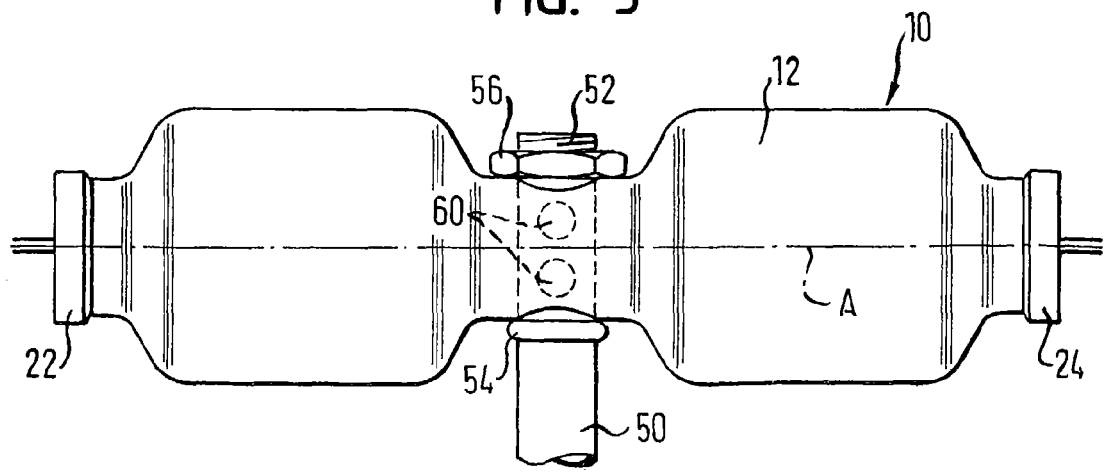
FIG. 3 shows the completely installed gas generating device according to the invention.

In FIG. 3, a gas generating device is illustrated, which consists of the previously described gas generator 10 and a gas conduit pipe 50. The gas conduit pipe 50 is only illustrated at one end, i.e. partially; with its longer section, it extends to a gas bag, not shown, or to another gas consuming device. The end which is shown is constructed so as to be linear and extends, in the state shown in FIG. 3, fastened to the outer housing 12, at right-angles to the central axis A.

Before the installation of the gas generating device into the vehicle, the gas conduit pipe 50, the external diameter of which corresponds substantially to the internal diameter of the openings 40, 42, is inserted through these openings 40, 42, until the free end 52, which is provided with an outer thread, projects again from the outer housing 12. At the opening 40, the gas conduit pipe 50 has a bead 54 acting as a stop, with which it lies against the outer housing 12. With a clamping device in the form of a nut 56 screwed onto the outer thread at the free end 52 of the gas conduit pipe 50, the outer housing 12 and the gas conduit pipe 50 can be braced against each other and fastened to each other. The end 52 of the gas conduit pipe 50, provided with the outer thread, is closed for example by means of a plug. Via the gas conduit pipe 50, the openings 40, 42 are largely or even completely sealed off towards the exterior.

For better sealing, O-rings can be provided between outer housing 12 and gas conduit pipe 50. In addition, in the region of the bead 54 and the nut 56, a flattening of the outer housing 12 is also conceivable, by deforming or by working.

In the section which is present in the outflow space 26, the gas conduit pipe 50 has several lateral inlet openings 60 which, in relation to FIG. 3, point into and out from the plane of the drawing, i.e. are at approximately 90 degrees to the planes formed by the membrane 34 and the membrane 36. The inlet openings 60 are therefore not immediately facing the chambers 12, 14.

The mode of operation of the gas generating device is explained below. The gas generator 10 is housed in any desired receptacles for transportation or subsequent storage, without devices having to be fastened to it to ensure neutrality with respect to thrust.

At the car manufacturer, as explained, the gas conduit pipe 50 is then fastened to the outer housing 12. The gas generating device is thus installed into the vehicle.

In the case of an accident, either one or both igniters 18, 20 are activated. The resulting pressure waves destroy the associated membrane 34 or 36, so that the generated hot gas and the stored pressurized gas from the chambers 14, 16 are mixed and arrive into the outflow space 26. Owing to the inlet bores 60 arranged to the side of the main outflow direction, a type of filter effect is produced. Hot particles can therefore be held back in the gas generator 12 and do not arrive into the gas conduit pipe 50. The hot gas flows via the inlet openings 60 into the interior of the gas conduit pipe 50 and to the gas consumer, e.g. a gas bag or a belt tensioner.

Figure 2:
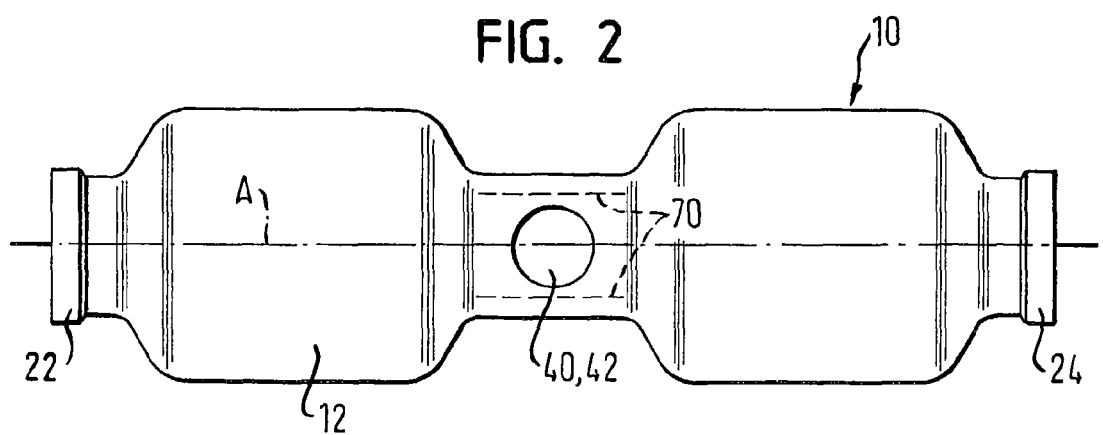
FIG. 2 shows a view of the gas generator according to FIG. 1 from above or from below.

The gas conduit pipe 50 also has an additional function, namely when only one igniter 18, 20 is activated, or the igniters 18, 20 are activated staggered over time. Then, in fact, it must be ruled out that via the generated pressure wave the membrane 34, 36 not associated with the stage of the activated igniter 18, 20 is also destroyed. The outflowing gas from the activated stage in fact partially rebounds on the gas conduit pipe 50 and can at least not directly strike onto the membrane 34, 36 which is not to be destroyed. This effect can be further intensified if, in relation to FIG. 2, the exterior of the gas conduit pipe 50 reaches close to the inner face 70 of the outer housing 12.

Other fastening mechanisms than those illustrated would be, for example, a kind of tapered seat of the gas conduit pipe 50 in an opening 40, 42 or, for example, snap rings or the like. Furthermore, it would also be conceivable to use a screw instead of the nut 56 and to have the end of the gas conduit pipe 50 terminate in the interior of the outflow space 26. The screw could then be screwed into an internal thread at the end of the gas conduit pipe 50 and would also serve to seal the gas conduit pipe 50.

The openings 40, 42 also do not have to be circular; other shapes of opening can also be provided, which for example are also suitable for ensuring a given alignment of the inlet openings 60 to the central axis A.

It is also to be stressed that the gas generating device is not restricted to a multi-stage gas generator or to a hybrid gas generator. It would also be possible to provide the special arrangement of the openings 40, 42 and the gas conduit pipe 50 mounted therein in a purely pyrotechnic gas generator or in a single-stage gas generator.

A gas generating device with a single-stage, purely pyrotechnic gas generator is illustrated in FIG. 4. The combustion chamber has reference number 80. An angled disc 84 with through-flow openings is arranged upstream of the combustion chamber wall 82. In the outflow space 26, a filter 86 is arranged around the gas conduit pipe 50, which, however, can also be omitted. The gas conduit pipe is fastened to the outer housing 12 by a stop in the form of a pin 88.

In FIG. 5 it can be seen that the inlet openings 60 face completely away from the combustion chamber 80, whereas in FIG. 4 they still lie at 90 degrees to the outflow openings 90 in the combustion chamber wall 82 and hence 90 degrees to the central axis A of the gas generator 10. In this embodiment, a securing ring 92 serves as a stop.

What is claimed is:

1. A gas generating device comprising a gas generator (10) which has an outer housing (12), and a gas conduit pipe (50) which is connected to said gas generator (10) and via which a gas flows out from said gas generator (10), said outer housing (12) having at least two openings (40, 42) via which said gas conduit pipe (50) as fastened to said outer housing (12) and through which said gas can flow out in a noninstalled state of said gas conduit pipe (50), characterized in that said gas generator (10) is neutral with respect to thrust in said noninstalled state of said gas conduit pipe (50) and, said gas conduit pipe (50) projecting into an interior of said gas generator (10) via at least one of said openings (40, 42), the other of said openings being closed by a closure device.

2. The gas generating device according to claim 1, characterized in that said openings (40, 42) via which said gas can flow out in said noninstalled state of said gas conduit pipe (50), are situated on opposite sides in relation to said outer housing (12).

3. The gas generating device according to claim 1, characterized in that said gas generator (10) has a central axis (A) and said two openings (40, 42) are arranged diametrically opposite to each other with respect to a central axis of said outer housing.

4. The gas generating device according to claim 1, characterized in that said two openings (40, 42) are the only outflow openings of said gas generator (10) in said noninstalled state of said gas conduit pipe (50).

5. The gas generating device according to claim 1, characterized in that said gas conduit pipe (50) has a stop at an end projecting out from said outer housing (12), and that a clamping device engages an opposite end of said gas conduit pipe (50).

6. The gas generating device according to claim 5, characterized in that said clamping device is one of a nut (50) and a screw.

7. The gas generating device according to claim 1, characterized in that said gas generator (10) is constructed so as to have at least two stages and said gas conduit pipe (50) is arranged between said at least two stages.

8. The gas generating device according to claim 7, characterized in that said individual stages of said gas generator (10) have a common outflow space (26) for gas which becomes free, into which space said gas conduit pipe (50) opens.

9. The gas generating device according to claim 8, characterized in that said individual stages of said gas generator are formed by closed chambers (14, 16) filled with compressed gas.

10. The gas generator according to claim 1, wherein said closure device is defined by said conduit pipe (50).

11. The gas generator according to claim 1 wherein said closure device closes said opening when said conduit pipe (50) is fastened to said outer housing (12).

12. A gas generating device comprising a gas generator (10) which has an outer housing (12), and a gas conduit pipe (50) which is connected to said gas generator (10) and via which a gas flows out from said gas generator (10), said outer housing (12) having at least two openings (40, 42) via which said gas conduit pipe (50) is fastened to said outer housing (12) and through which said gas can flow out in a non-installed state of said gas conduit pipe (50), characterized in that said gas generator (10) is neutral with respect to thrust in said noninstalled state of said gas conduit pipe (50) and that via at least one of said openings (40, 42) said gas conduit pipe (50), which is of cylindrical shape, projects into an interior of said gas generator (10), characterized in that said gas conduit pipe (50) extends right through said two openings (40, 42) and through said outer housing (12).

13. A gas generating device comprising a gas generator (10) which has an outer housing (12), and a gas conduit pipe (50) which is connected to said gas generator (10) and via which a gas flows out from said gas generator (10), said outer housing (12) having at least two openings (40, 42) via which said gas conduit pipe (50) is fastened to said outer housing (12) and through which said gas can flow out in a non-installed state of said gas conduit pipe (50), characterized in that said gas generator (10) is neutral with respect to thrust in said non-installed state of said gas conduit pipe (50) and that via at least one of said openings (40, 42) said gas conduit pipe (50), which is of cylindrical shape, projects into an interior of said gas generator (10), characterized in that said gas conduit pipe (50) extends into said interior of said gas generator (10) and has lateral inlet openings (60).

14. A gas generating device comprising a gas generator (10) which has an outer housing (12), and a gas conduit pipe (50) which is connected to said gas generator (10) and via which a gas flows out from said gas generator (10), said outer housing (12) having at least two openings (40, 42) via which said gas conduit pipe (50) is fastened to said outer housing (12) and through which said gas can flow out in a non-installed state of said gas conduit pipe (50), characterized in that said gas generator (10) is neutral with respect to thrust in said non-installed state of said gas conduit pipe (50) and that via at least one of said openings (40, 42) said gas conduit pipe (50), which is of cylindrical shape, projects into an interior of said gas generator (10), said gas conduit pipe (50) has a stop at an end projecting out from said outer housing (12), and that a clamping device engages an opposite end of said gas conduit pipe (50, characterized in that one of said ends of said gas conduit pipe (60) is closed.

* * * * *